J. R. Buchanan,
Manf. Salt.
No. 113,250. Patented Apr. 4, 1871.
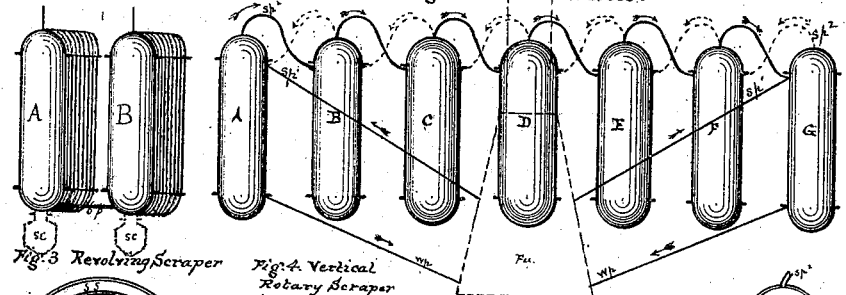
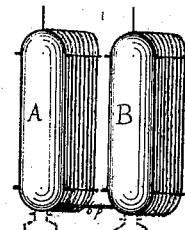
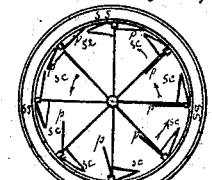
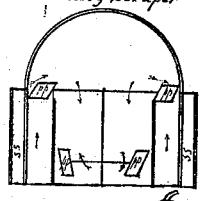
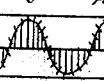
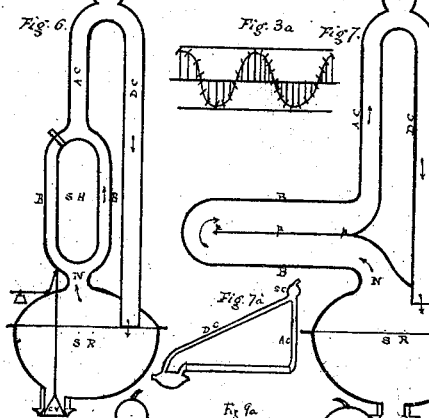
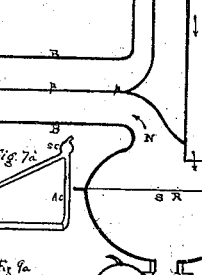
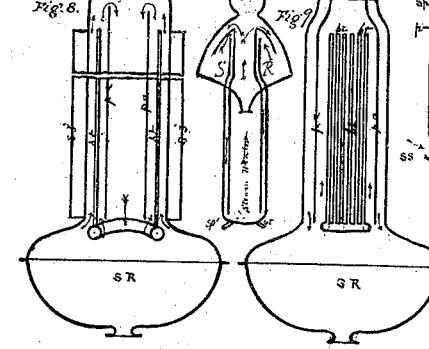
Witnesses
F. W. Howard
A. M. Stont
Inventor
Jos. R. Buchanan I'm # United States Patent Office.

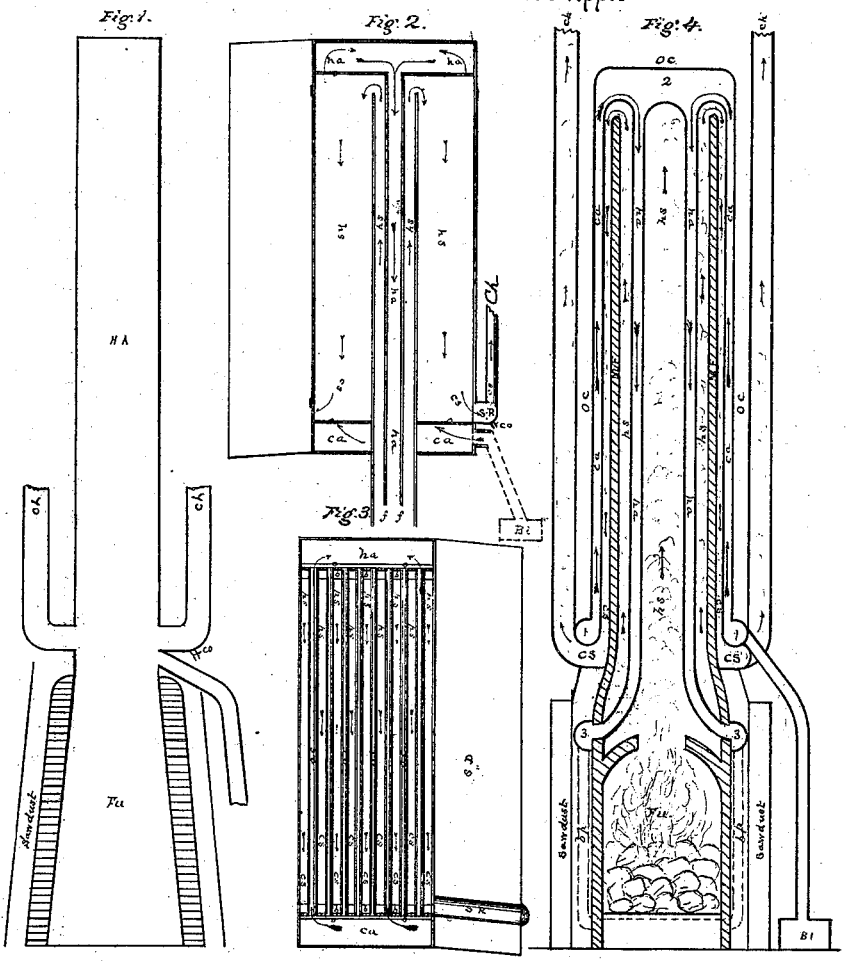

JOSEPH R. BUCHANAN, OF LOUISVILLE, KENTUCKY.

Letters Patent No. 113,250, dated April 4, 1871; antedated March 21, 1871.

IMPROVEMENT IN THE MANUFACTURE OF SALT.

The Schedule referred to in these Letters Patent and making part of the same.

I, JOSEPH R. BUCHANAN, of Louisville, in the county of Jefferson and State of Kentucky, have invented certain new and useful Improvements in the Manufacture of Salt, of which the following is a specification.

The improvements embraced in this specification relate to the manufacture of salt by boiling, and they are properly but parts of my invention, which might have been embodied in my patent of July, 1870, but which, on account of their extent and multiplicity of details, were not introduced in connection with the fundamental invention of which they are co-operative parts, all important to be known and understood by those who undertake to manufacture salt under my plans.

The improvements relate to—

First, the economy and efficiency of the furnace.

Second, the efficient and complete removal of salt from the boilers and prevention of incrustation.

Third, variations in the forms, arrangement, and connections of the boilers, desirable under different modes of using and combining them for different brines, different pressures, and other circumstances, and necessary to the completeness of the invention.

1. *The Furnace.*

I propose to use that style of regenerative furnace which I have ascertained to be the best for the economical application of caloric.

I surround the furnace (Figure 1, sheet 1) with a layer of sawdust or other good non-conductor, as heretofore mentioned, inclosing it with tin-plate, Russia iron, wood, or other suitable exterior.

I then supply the air of combustion by a blower of any suitable construction, and cause the said air to pass through the products of combustion which are escaping from the furnace, and rob them, not only of their sensible, but of their latent heat, so as to feed the fire with air elevated to between 500° and 1,000°, or even higher in some cases.

This is effected by compelling the products of combustion to descend in very narrow channels between the planes of ascending cold air, and become so thoroughly cooled that all the vapor is condensed, gives up its latent heat, and escapes by discharge as water.

The amount of caloric thus saved which is usually wasted would be not less than six million (6,000,000) equivalents (as defined by Joule and others) for every ton of coal, and the amount recovered by condensation (coal being the fuel) would be six hundred (600) equivalents for every pound of coal.

These results may be attained by several forms of apparatus, and I propose two forms as being the best adaptations for my present purpose of a heat-absorbent apparatus.

In the first, Figures 1, 2, 3, sheet 1, the smoke, ascending in a central narrow channel or flattened flue, $ff$, passes out on each side, and descends through the smoke-channels $hs\ cs$, entering as hot smoke and leaving as cold smoke, discharged finally by the exterior chimney $ch$.

These smoke-passages are formed by combining a corresponding number of flattened air-channels $ac\ ac$, fig. 3, sheet 1, which may be compared to tubes five or ten feet long, and eighteen or twenty-four inches in diameter, flattened until their sides are within less than an inch of each other; these being erected parallel to each other, so as to leave spaces of one or two inches width between them. These spaces become channels for the descending smoke $hs\ cs$.

The smoke occupies all the spaces surrounding as well as between the air-channels, which air-channels are like flat tubes passing up through a smoke-box, and conveying the air from an air-chamber below, $ca\ ca$, where it first enters cold from the blower to an air-chamber above, $ha\ ha$, where it is well heated from its passage upward through the narrow channels.

The smoke-boxes or main body of the apparatus, the cold-air chamber below, the hot-air chamber above, and the flattened channels that connect these hot and cold-air spaces, constitute nearly the whole structure.

We have only to add that the hot air from $ha\ ha$ descends through the middle of the flattened flue $ff$ by a flattened channel, $ha\ ha$, and is conducted by pipes or flues down the walls of the furnace to discharge the hot air under the grate and supply the fire with oxygen, being forced through it by the pressure of the blower; and this pressure continuing through the fire, forces the smoke up its flattened flue, and then down the smoke-passages between the air-channels, and out at the chimney or chimneys $ch$, robbed of its heat.

A practical advantage of this structure is that it is so easily taken to pieces and cleaned or repaired.

The air-channels being flattened tubes with their ends flared out like a flange, are set up together by being simply inserted in a rack or grate-frame at the top, and in like manner at the bottom, the flared or flanged ends resting on the grate-bars $b\ b\ b$, fig. 3, sheet 1, upon or against which they are fastened by the bars of a corresponding rack or grate-frame, $o\ o\ o$, which, being screwed or fastened tight, make a substantial joint.

Four rods at the corners keep the top and bottom frames $b\ b\ b$ in position, and the exterior walls being hinged on these four rods or columns, as doors, fitting tightly all around, either side may be opened at any time, and, by opening the side door s d and loosening the grate-frames, the air-channels may be taken out.

In the above structure the bottom grate-frame o o o, which compresses and holds the flanges of the air-channels, should be hollowed out on its upper surfaces, so as to receive and convey off the water of condensation from the smoke-passages and deliver it to the smoke-receptacle s r, from which the chimney ch takes the smoke, and the cock co discharges the water.

With some species of fuel, especially wood, the amount of vapor in the products of combustion is too great to admit of its being condensed by the incoming air, and in that case the discharged smoke should be conducted through pipes in a brine-vat, to heat the fresh brine, or be utilized by throwing it into the steam-spaces of the vacuum evaporator.

The free combustion produced by the ample supply of air diminishes the amount of soot that would be formed in such an apparatus, and the rapid motion of the smoke contributes to keep it clear.

In the other structure, Figure 4, sheet 1, a blower impels the cold air through ascending channels parallel to the descending smoke, and then down the main flue M F, through pipes which finally deliver the hot air at the grate of the furnace.

The cold air goes first to the circular channel 1, from which it ascends in a circle exterior to the circle of descending smoke, and as the latter reaches the level of the entering air it is cooled and its moisture precipitated, which is discharged by the cock co, while the cold smoke is forced up the chimney ch.

The simplest description of this structure is to state that the main flue or chimney M F rising from the fire has an exterior cylinder or cap, closed above, slipped over it like a sleeve, with a space of an inch or more between them, down which the smoke is compelled to descend until it reaches the circular receptacle c s, from which it is discharged by the outer chimney.

Exterior to this cylinder or sleeve is another just like it, o c, connected with it as one structure, and between these two the cold air ascends, heated by the interior cylinder as it passes, until, arrested at the upper end, it is driven down through the descending pipes ha ha, in the main flue above the fire, and, being delivered into a circular receptacle, 3, passes therefrom, by pipes or channels bp, to the bottom of the grate.

An exterior investment or casing of non-conducting materials should be added, to inclose the entire heat-absorbent structure.

The discharge of the condensed steam from this apparatus is easily made by opening a cock in the receptacle cs.

To perfect the condensation it will be necessary that the main flue M F should be substantially constructed of non-conducting materials, so as not to impart to the descending smoke the heat of the interior ascending current. A double case of Russia iron, with felt, sawdust, or similar non-conductors interposed, would answer.

This structure will be easily cleaned by lifting the cylinders, which may be jointed like a stove-pipe.

In a furnace provided with this heat-absorbent apparatus the heat, if not absorbed rapidly by the boiler, rises rapidly to a great intensity, and a pyrostatic liquid, which will not produce much pressure at high temperatures, and which has great power of carrying caloric, is a desideratum. I propose for this purpose a saturated solution of caustic soda or potassa, preferring the former, which will carry, almost without pressure, a temperature approximating a red heat. I propose to use this in boiler-tubes, and circulate it rapidly by a rotary pump, as a substitute for steam-heating. The amount of caloric which may thus be conveyed is equal to that of a corresponding mass of red-hot iron.

The high temperature of the products of combustion in such an apparatus, where the heat is not very rapidly consumed, will render it desirable that those portions of the heat-absorbent apparatus nearest to the fire should be constructed of enameled iron, firebrick, bauxite, or some other equally refractory substance, to endure the heat.

Salt Collecting.

When brine is evaporated in close boilers the removal of the salt from its incrustation on the evaporating-surfaces and its delivery from the boiler are matters of the highest importance. In my first plans, as recorded in my caveat, I relied upon the length of the evaporating-tubes and boilers and the rapidity of the ebullition-current thereby produced, which was separated from the descending current by a central partition or cylinder, through which the brine descended, carrying down the salt. This was a proper method, and I now propose to enlarge and vary the methods to be adopted, so as to meet all emergencies or difficulties.

There are but three methods by which the removal of incrusting salt from evaporating-surfaces may be effected, viz:

First, by positive mechanical force, as by scraping or brushing;

Second, by fluid currents, each of which methods requires peculiar devices for its application; and Third, by solution, which requires combined boiler arrangements.

Mechanical Force.

This may be most conveniently applied by revolving-scrapers or brushes continually passing over the evaporating-surfaces.

A reciprocating scraper or brush may also be used, especially when the evaporating-surfaces are tubes.

The scraper may be propelled by an external force, or may be arranged to be moved by the currents of ebullition in the brine, as in fig. 3, sheet 2.

A shaft running the entire length of the boiler may be armed with scrapers, extending out to touch its internal surface.

The plane of the scraper should be at an acute angle to the plane of its revolution, so that it would throw the scraped substance to one side like a plow, and the scrapers should follow each other in a spiral manner, Figure 3ª, sheet 2, so that each, advancing a little further, would carry the substance gradually to one end of the boiler, as by a screwing movement.

The edge of the scraper may be a plate of thin metal, a wire brush, or any elastic substance that would apply a moderate friction, with a hard substance at its end.

When the scraper is to be propelled by the force of ebullition arms should be extended from the shaft, (between the spirals,) and provided with floating paddles, as shown in fig. 3, p p p, sheet 2, which, being attached or hinged by their outer ends on the rear side of the revolving arms, will float loosely as the arms descend, but will rest against them as they ascend, and receive the impulse of the ascending current of ebullition, so as to be efficient propellers in a boiler of large diameter. Their efficiency may be increased by the addition of a steam-cap, s c, at the outer end of the arm, which will catch the bubbling steam as it ascends and discharge it as it passes the vertex of the circle. Each cubic foot of steam thus caught will add about sixty pounds to the force of rotation.

The spiral arrangement of the scrapers is not essential. If they are set at the proper angle on longitudinal bars the result will be attained very well Two such bars will be entirely sufficient for the scraping, and the remainder of the space may be used for the floating propellers p p and the steam caps sc sc.

The steam-caps should, of course, be close to the circumference of the boiler to collect steam, as the evaporation or boiling is effected by external heat from the steam-spaces s s.

In the vertical boilers a single longitudinal scraper of moderate friction, like a wire brush, will be sufficient, and may be propelled by the current of ebullition ascending exteriorly or descending interiorly.

Vanes like a windmill, or arranged in a spiral, may be located so as to be turned by the outer ascending or the inner descending current. The former is shown in fig. 4, sheet 2, as well as the latter.

Fluid Currents.

The removal of salt and prevention of its incrustation by fluid currents require that they should have a speed of about five miles an hour. The most reliable method of producing any speed that may be required is by means of a pump. In applying a pump to a boiler for this purpose it becomes necessary that the rapid current through the boiler should flow into an enlarged space, in which the salt may be deposited as the speed becomes diminished.

In Figure 5, sheet 2, the pump is combined with a concentric cylinder boiler, and the current which passes through the boiler passes into the salt-receptacle S R, which, having about fifteen times the sectional area of the channel which brings in the salt, reduces the speed of the brine to a rate that will allow the salt to be deposited.

The ends only of the boiler are shown in the drawing, but in Figure 5ª the proportions are more nearly illustrative, and the arrangement shown of a central steam-tube and one steam-space is that which will be found best adapted to high pressures, as the whole may be comprised in one foot diameter, with elongation at discretion.

This combination is especially adapted to vertical boilers, in using which the salt may be delivered into a receptacle at the upper end of the boiler, which will be very convenient for its removal, (see Figure 9ª, in which the upper salt-receptacle is attached to a boiler without a pump, receiving the salt from the ascending instead of the descending current.)

A rotary or centrifugal pump, as it would be less liable to obstruction by the salt, would be appropriate, and perhaps preferable.

The current of ebullition, however, may be sufficient, if the length of the ascending column be sufficiently increased, to prevent all incrustation. I therefore propose a system of

Accelerator Channels,

For the removal of the salt, constituted as follows:

At the upper end of a vertical or the end of a horizontal boiler I add a vertical channel, in which the boiling brine and steam-bubbles may ascend, and prolong it downward from its summit, as at A C D C, the ascending and descending channels of Figures 6 and 7, ending it in the enlarged salt-receptacle S R, from which, through the neck N, the brine returns to the boiler and the circulation is regularly maintained.

In the horizontal boiler, a horizontal partition, to separate the incoming and outgoing currents, is expedient, as shown in fig. 7, but this may be dispensed with by connecting the receptacle with one end of the boiler, and the ascending channel with the other, as shown in fig. 7ª.

The heating arrangement of the boiler, fig. 6, may be either a cylindrical condenser, as shown, or a collection of vertical tubing, as shown in my patent of July, or an external steam-jacket, or a combination of these methods, or a concentric combination, as shown in fig. 5.

I simply propose to add an ascending and descending channel (running to a receptacle) to any plan of boiler, and, as it may sometimes be preferable not to have the channels exterior, I propose in that case to run them within the boiler, as in Figures 8 and 9.

In fig. 8 I show a current of ascent produced by the vertical boiling-tubes bt bt, located in a circle between the cylindrical partition pa pa, and the shell of the boiler, which is heated by a steam-jacket and doubles the force of ebullition, which, being confined in a narrow circular channel, makes a very rapid ascending current, the rapidity of which depends on the temperatures used and the length of the ascending column. I propose to give this column a length of fifteen to thirty feet, (with arrangements to diffuse the steam uniformly through the column of water,) to make it a powerful accelerator channel.

The evaporating surfaces need not extend more than one-half or two-thirds of the vertical length of the channel. The descending channel in this latter case is formed by the cylindrical partition that stands interior to the boiling-tubes, and the lower end of the boiler is enlarged into a huge salt-receptacle, as shown in the drawing.

In fig. 9 the same idea is developed, with a slight modification. The elongated boiler, with a bulbous enlargement of its lower end, has its boiling-tubes and ascending currents in the interior, and its descending current in the exterior, circle.

Above the upper extremity of the boiling-tubes the ascending and descending channels are reduced in diameter, and may be prolonged indefinitely, to give force to the ascending current.

An elongation of twenty or thirty feet, above boiling-tubes 50° or 80° hotter than the surrounding brine, would make a current of great power, and to produce its full effect the descending channels should be larger than the ascending.

The Circulator.

The foregoing methods of mechanical removal by scraping or friction, and fluid removal by pump-currents or ebullition-currents, will overcome the most obstinate difficulties of incrusting brines; but in some cases, from the nature of the evaporating-surfaces, but little mechanical force may be required, and in such cases the structure which I call a circulator, Figure 13, will effect all that is necessary. This consists of a series of inclined planes ip ip, fig. 13, which may be combined with any suitable form of steam-heater, and a nearly horizontal plane, lp, in combination, by which the boiling brine is thrown in a current above to the right end of the boiler, and passes below to the left end, beneath the plane lp.

At each end a pocket, po po, receives the falling salt from the quiet part of the current. The salt-carrier (of my first patent) should be attached to these pockets to remove their contents as often as necessary.

Removal by Solution.

The removal of incrusted salt by solution requires the application of fresh or unsaturated brine, and necessitates the removal of the saturated, to introduce the unsaturated brine. This may be best effected in a series of boilers by reversing their action and converting the evaporators into concentrators as often as the occasion arises.

Hence, I propose to construct a reversible series of boilers, fig. 1, sheet 2, and to connect the steam-pipes from the furnace-boiler with either end of the series, so that the transfer of steam and caloric may be in the order A B C D E F G, or from the boiler G, in the order G F E D C B A.

The vacuum-evaporator H will connect with the last or G for its steam, or, when the order is reversed, will connect with A.

The double series of steam-pipe connections, as shown in the drawing, renders it easy, by closing one set, to reverse the action by sending steam from the furnace to operate on the other line. In this arrangement, the boiler at each end of the series should correspond, and be adapted to the highest pressure by having a smaller diameter, while the diameter may increase to the middle of the series, which sustains the least pressure.

The arrangements of the evaporators to remove the salt by the salt-carriers will, of course, require to be attached to a corresponding number (say three) at each end of the series, and the connections with the pressure-chamber will have to be reversed.

The connection of the concentrators by the pipe $dp$, as shown in my patent, will require to be closed by a cock, and the devices by which the evaporators are supplied from the pressure-chamber will have to be attached to each boiler that may be required to act as an evaporator. In other words, each boiler will require double connections with the pressure-chamber, to enable it to act alternately in different capacities.

It will also be expedient to prolong the neck which communicates to the salt-carrier below the conical valve, and introduce a large stop-cock, as better adapted than the conical valve to sustaining high pressure.

The exterior steam-jacket may or may not be retained in the entire series. The necessity for its use will be in proportion to the number of the series; a very short series would not require it.

Twin Series.

Another mode of reversing the action to dissolve incrustation is by establishing two exactly corresponding series, which are connected together and act as one, making a twin series. In this arrangement, fig. 2, sheet 2, each boiler of the series A (which may be of any required number, say from five to eight or ten) is connected with the corresponding boiler of the similar series B, by a brine-pipe, $bp$, and all the boilers of the series A act as concentrators, while all of the series B act as evaporators, and have the salt-carrier attachments $sc$, to remove the salt as formed.

The passage of the brine from A to B may be governed by a float, adjusted to open the valve when the brine is nearly saturated; or it may be left entirely free, so that the boilers will maintain about the same level, and the amount supplied to each will be determined by its consumption or evaporation.

The amount drawn by B from A will be about one-half of the amount supplied to A to keep it full, and as it will come from the bottom of A, will be of the most concentrated brine.

The fresh brine supplied to A at its upper end will remain above until concentrated, and the saturated brine will naturally collect at the bottom and pass over to B as fast as the evaporation in B lowers the level of its brine.

Whenever the saline incrustation of B requires removal, the operation is changed by simply attaching the supply-pipes for brine to B and detaching them from A. If a Gifford injector is used, that of A is closed by its cocks, and that of B is opened, so that the supply of fresh brine to B concentrates in it and passes, as concentrated to supply the demand of A. Thus a mere pipe-connection of the corresponding boilers is sufficient, and the pressure-chamber is unnecessary.

The twin series may be adapted to brines of any degree of dilution by increasing the proportional size and evaporating power of the first series that receives the brine. This disproportion will render it necessary that the reverse action should be only for the shortest time necessary to remove incrustation. For brines as weak as sea-water a triple or quadruple series might be used, developing salt only in the last series; or the series might be even more numerous. In reversing such a series, we need a salt-collecter only for the boiler at each end.

The principle developed by these plans is, that the gradual consumption of caloric by successive transfers, lowering its intensity from boiler to boiler, need not be accompanied by any corresponding concentration of the brine as proposed in my patent, but that the succession of boilers of different temperatures may operate on brine of the same grade, and the concentration may take place not by passing from a boiler to another of lower temperature, but by passing from series to series at similar temperatures, and that the series may be twin, triple, quadruple, quintuple, or more numerous, and may be strictly equal, or may be very unequal, as when a twin series operates on very weak brine, and the concentrator-series may be five or ten times as large as that which usually acts as the evaporator series.

The peculiar process which this improvement develops is that of operating a series of transferring-boilers (by which I mean a series operating in connection on the same caloric) on brine of the same grade, and operating combined series in connection on brines successively concentrated from each series to the next.

The transferring series, operating on the same caloric, may be properly called a monothermal series, and when arranged as shown in fig. 1, second sheet, becomes a reversible monothermal series. The arrangement shown in fig. 2, sheet 2, constitutes the combined parallel series, each member of which is a single monothermal series.

By thus disconnecting the serial concentration of brine from the serial transfer of heat we gain a better control of incrustation and the greater simplicity of structure, which is displayed in fig. 2. The construction of quadruple and quintuple parallel series gives a peculiar adaptation to weak brines.

Forms of Boilers.

The concentrator-boilers, which were delineated in my patent without variation from the single type given for the whole machine, may be more advantageously thrown into a horizontal position in many cases, and when thus arranged the heaters may be modified as follows:

The condensing-tubes should be arranged as compactly as possible in the lower two-thirds of the boiler, and each end inserted in a steam-space, one of which supplies the steam and the other removes the water of condensation.

For extreme high pressures in the first boiler we may use either the concentric boiler, shown in figs. 5 and 5ª, or the compound tubular, shown in Figures 10 and 11. In fig. 10 a main horizontal pipe has a series of small circular pipes connected with it, as shown. In fig. 11 the main pipe, which may be four or five inches in diameter, has a large number of short, straight pipes inserted in its circumference, so as to bristle in every direction, like a porcupine, and fill the interior space of the boiler. Each of these forms gives a large amount of surface and sustains a very high pressure. The condensed steam easily escapes by $w$ $t$, the water-tube at one end.

For a moderate pressure, as in the fourth boiler of the series, the flask-heater, Figure 12, is desirable, as it gives a large amount of surface, and may be made of cast-iron. It is simply a main pipe of four or five inches diameter internally, with flask-formed vessels connected with it by their necks, as shown.

The last of the evaporator series or vacuum evaporator should be constructed so as to evaporate from shallow vessels and condense by the cold brine, as shown in Figure 16, in which several long, shallow pans are superimposed on each other to make a compound evaporator.

The steam-spaces $s\ s$, at the bottom of each pan, under its whole length, receive their steam at one end, and at the other discharge their condensation by the pipes $w\ t$, which may be assisted by a pump.

The vapor arising from these pans, at a temperature between 130° and 160°, passes by the tubes $s\ p^2$ into the tubes of the condensing-vat $c\ v$, from which it is pumped, there being an interval of about 90° of temperature between the condensing-vat and the vacuum evaporator.

I propose to use two other forms of boilers, designed for operating on a smaller scale, and adapted to working in a concentrator and evaporator series, or to being detached and used separately.

Figure 15, the tilting boiler, is simple in construction, and being supported and turning on two pivots, $p\ p$, it is easily turned over to empty its contents. Two small vertical boilers are fitted into each other, so as to leave a steam-space between, and are firmly fastened by their flanges together.

The cap of the boiler $c\ a$ is fastened by its flanges to the lower part by means of a yoke and screw, $y\ s$, as heretofore explained, for the connection of the salt-carrier. It receives steam at $s\ p$, and discharges the water of condensation at $w\ t$.

The brine is supplied by the pipe $b\ p$, which extends from the inner through the outer vessel, and the steam of the boiling passes off by $s\ p^2$. It is thus adapted to work in the series, or detached.

The mushroom heater boiler, Figure 14, has the same simplicity and general objects, and may be used in the series, or detached. Its interior is occupied by hollow vessels, screwed together by their necks, of mushroom shape, which rapidly condense the steam coming in by the pipe $s\ t$, and discharge the water of condensation by $w\ t$.

Doors $d\ d$ are provided on each side of these pipes to discharge the contents, and a brine-pipe opening is made in the flange at $b\ p$, where the top is fastened, as in the tilting boiler.

Preventive Arrangements.

To diminish incrustation I propose to enamel the evaporating surfaces used with an enamel composed of sand or pulverized quartz, ten parts; cryolite, ten; oyster-shell lime, two; pulverized bottle-glass, two.

Claims.

The improvements which I claim, and for which I desire Letters Patent, are—

1. The combination, with a salt-boiler, of a pump to establish a rapid current through it.

2. The combination, with a salt-boiler, of the ascending and descending channels A C D C, to establish a rapid current through it by the force of ebullition.

3. The combination of the channels A C D C in a concentric manner, as shown in figs. 8 and 9, and their prolongation through the boiler.

4. The combination, with a salt-boiler, of the circulator and salt-pockets, fig. 13, being the series of inclined planes $i\ p\ i\ p$ and $l\ p$, to establish currents between the pockets $po\ po$.

5. The combination, with a close salt-boiler, of the revolving spiral scraper, fig. 3ª, to effect the removal of salt while under pressure.

6. The combination, with a revolving scraper for a close salt-boiler, of the propelling floats $p\ p\ p$ and the steam-caps $s\ c\ s\ c$, substantially as described, for the purposes mentioned.

7. The combination, with a vertical salt-boiler, of the vertical rotary scraper, fig. 4, and the propelling-paddles $p\ p\ p\ p$, substantially as and for the purposes described.

8. The combination, with a monothermal series of boilers, of double steam-pipe connections, in such a manner as to make their serial action reversible, substantially as described.

9. The combination of two or more monothermal series of boilers into combined parallel series, substantially as described.

10. The combination, with a brine-boiler, of the compound tubular steam-heating and condensing structure, shown in figs. 10, 11, substantially as described.

11. The combination, with a brine-boiler, of the flask-heater or condensing-vessel, as shown in fig. 12, substantially as described.

12. The combination, with a monothermal series of brine-boilers, of the compound vacuum evaporator, fig. 16, or equivalent structures, for vacuum evaporation by the heat of vapor.

13. The tilting boiler, fig. 15, substantially as described, for serial or detached use.

14. The brine-boiler, fig. 14, with the mushroom heater and serial connections, substantially as described.

15. The combination, with a brine-boiler, of a series of concentric cylinders, forming condensing steam-heaters, figs. 5 and 5ª, substantially as described.

16. The combination of narrow descending smoke-channels and ascending cold-air channels to effect the condensation of the vapor and recovery of the latent and sensible heat in the products of combustion.

17. The combination of the parallel flattened air-channels $a\ c$, sliding upon a rack in a smoke-chamber, to extract the caloric of the smoke, substantially as described.

18. The combination, with the flue which conveys the products of combustion, of the two inverting-cylinders $o\ c$, fig. 4, sheet 1, and their appendages, the channels $h\ a\ 1\ 2\ 3$, for the recovery of heat and condensation of vapor by an upward current of cold air.

19. The method of transferring heat from a furnace by a concentrated solution of caustic soda or potassa circulated in tubes, or equivalent arrangements.

J. R. BUCHANAN.

Witnesses:
  F. W. HOWARD,
  A. M. STOUT, Jr.